United States Patent [19]

Wills, Jr.

[11] 4,019,918
[45] Apr. 26, 1977

[54] PORTLAND CEMENT COMPOSITIONS

[75] Inventor: Milton Herman Wills, Jr., Adelphi, Md.

[73] Assignee: Martin Marietta Corporation, Bethesda, Md.

[22] Filed: Feb. 2, 1976

[21] Appl. No.: 654,336

[52] U.S. Cl. .................................... 106/90; 106/97; 106/315

[51] Int. Cl.$^2$ ..................... C04B 7/02; C04B 7/02; C04B 13/00

[58] Field of Search ............................... 106/90, 97

[56] References Cited

UNITED STATES PATENTS

| | | | |
|---|---|---|---|
| 3,071,481 | 1/1963 | Beach et al. | 106/97 X |
| 3,582,376 | 6/1971 | Ames | 106/90 |
| 3,689,294 | 9/1972 | Braunauer | 106/90 |
| 3,782,984 | 1/1974 | Allemand et al. | 106/90 |
| 3,864,141 | 2/1975 | Uchikawa et al. | 106/90 X |
| 3,959,004 | 5/1976 | Stayker | 106/90 X |
| 3,960,582 | 6/1976 | Ball et al. | 106/90 |

Primary Examiner—Winston A. Douglas
Assistant Examiner—William G. Wright
Attorney, Agent, or Firm—John A. Crowley, Jr.; George W. Moxon, II.

[57] ABSTRACT

High strength Portland cement compositions comprised of Portland cement clinker which has been ground to a specific surface area of between about 4400 cm$^2$/g and up to 6000 cm$^2$/g, alkali or alkaline earth lignosulfonate in an amount of between about 0.75 and 1.25 percent by weight, sodium bicarbonate in an amount of between about 1.25 and 2.5 percent by weight, and gypsum in an amount of between about 1.5 and 4.0 percent by weight, wherein the lignosulfonate and the bicarbonate are present in a ratio of about one to two and the cement product formed has a porosity of less than about 5 percent by volume voids. The cement compositions have an adequate plastic period of from at least about 90 minutes, as well as adequate and/or improved one and twenty-eight day strengths of in excess of about 5000 psi and 6000 psi, respectively. Sand or sand, crushed rock and/or gravel can be incorporated into the cement mixes or compositions to form mortar and concrete products.

14 Claims, No Drawings

PORTLAND CEMENT COMPOSITIONS

BACKGROUND OF THE INVENTION

This invention relates to Portland cement and more particularly, to Portland cement mixes, which, when mixed with enough water to effect setting thereof, possess an adequate plastic period while achieving adequate and/or improved 1 and 28 day strengths.

Portland cement is a powdered material which is made by burning a ground mixture of limestone and clay or shale to produce clinkers composed primarily of mixed calcium silicates, calcium aluminates, and calcium aluminoferrites. The clinkers, together with a few percent of gypsum, are then ground to a fine powder, which, when mixed with water, forms a paste that, when properly made, sets within a few hours and hardens slowly.

When sand or sand, crushed rock and/or gravel are incorporated in cement paste, mortar and concrete are obtained. The paste acts as the cementing material and its composition has a decisive effect on the mechanical properties of the resultant concrete, i.e., strength and dimensional stability. During the early stages of hardening, while in contact with water or air saturated with water, concrete expands slightly. Subsequently, when the concrete is exposed to lower ambient humidities, it shrinks.

Standard, high-early-strength Portland cement compositions, i.e., mortars and concretes, develop strength very slowly and will on the average take about 6 hours to develop about 125 p.s.i. compressive strength and far in excess of 24 hours to develop about 5000 p.s.i. compressive strength. The time over which cement is permitted to set results in a steady increase in strength over a considerable period. Thus, standard procedures for testing cement strength properties include tests conducted after setting periods of 1,7 and 28 days. However, strength improvements in concrete continue for a number of years.

Frequently because the concrete is slow to gain strength after it begins to set and in order for the concrete to achieve an adequate 1-day strength, e.g., over about 5000 pounds per square inch (psi), an accelerated curing process must be employed. For example, in making concrete beams or pre-stressed concrete panels, it is desirable that the cast concrete object have adequate 1-day strength so that the mold or form can be removed from the object within a day or less. Then, the mold or form can be re-used to shape a further amount of concrete to make further panels or beams and so need not be tied up while the cast concrete object achieves the strength necessary to remove it from the shaping means, i.e., the mold form or the like. Frequently, cement products which achieve adequate 1-day strengths, when aided by an acceleration process, do not achieve adequate 28 day strengths, e.g., over 6000 psi. While this does not make the products inoperative, it does make them less than desirable.

One method by which cast concrete objects are cured in an accelerated fashion is that of steam curing. By that process, steam is played against the cast concrete objects, which have been placed in curing kilns to confine and concentrate the steam for a period of about 18 hours. While the products will achieve adequate one-day strength in this manner, the steam curing process involves a considerable expense in terms of combustion of fuel to fire boilers, distribution systems for the steam, curing kiln equipment, and the like, as well as the expense of maintenance.

If a Portland cement clinker is ground without the addition of a retarder (e.g., gypsum) its interaction with water is usually rapid causing a sharp increase in temperature termed a flash set. This is due to the rapid hydration of tricalcium aluminate accompanied by crystallization of the calcium aluminate hydrates that a quick setting cement because set is so rapid as to prevent removal from the mixer and is not amenable to handling or finishing.

When gypsum is added as a retarder, it reacts rapidly with the dissolved aluminate in the presence of calcium hydroxide to form calcium sulfoaluminate. Even today, it is not quite clear why a small addition of gypsum is capable of preventing flash setting of cement. There is no doubt, however, that gypsum quickly reacts with tricalcium aluminate ($C_3A$) to form a compound practically insoluble in water; this compound is called calcium sulfoaluminate. The calcium sulfate or gypsum is added to the clinker usually in an amount of about 5 to 8% of the weight of the cement.

Even with the inclusion of the gypsum, early or premature stiffening (false set) sometimes occurs, which can be troublesome if it occurs before the concrete is placed. False set in cement is evidenced in concrete by a significant loss of consistency shortly after mixing. After additional remixing, however, this concrete regains its original consistency.

There are many additional problems arising from the use of gypsum. First, it is difficult to feed accurately, as large lumps are difficult to handle and fine materials favour segregation of the clinker-gypsum mixture. Second, gypsum has to be free from surface moisture and it has to be stored under shelter otherwise it tends to cake and bridge in the feed bins. Third, the quality of gypsum is not too consistent, since it contains such impurities as clay, silica and calcium carbonate. Fourth, gypsum ($CaSO_4 \cdot 2H_2O$) often contains anhydrite ($CaSO_4$) which has an unsatisfactory effect on the setting time of cement. Fifth, gypsum has no structural strength and weakens the strength of the Portland cement since as much as 8% gypsum is sometimes added to the clinker. Sixth, the temperature in the grinding mills has to be kept at less than 350° F to prevent partial dehydration of gypsum to anhydrite.

Because of the unpredictable results which occur when using gypsum retarders, many efforts have been made to find substitutes for gypsum in order either to avoid having to use gypsum retarding mixes altogether, or alternatively to achieve more suitable mixes having more consistent performance characteristics. For example, Braunauer U.S. Pat. No. 3,689,294 adds an alkali lignosulfonate in combination with an alkali metal carbonate (in particular, potassium carbonate) to a finely ground (6000 to 9000 cm²/g Blaine fineness) cement during the grinding step, and achieves a lower water-to-cement ratio than is conventionally utilized, as well as a workable concrete, while obviating the need to add gypsum to the cement powder. But Braunauer does so with a sacrifice of setting times, i.e., when Braunauer's 1-day strengths were sufficiently high in his mortars and concretes, the setting times were relatively low, e.g., less than 40 minutes, and in most instances less than 25 minutes. As another example, Landry, U.S. Pat. No. 3,689,296 teaches the use of a set retarder comprising the reaction product of formaldehyde and an aminolignosulfonate as a substitute for gypsum.

Thus, a need exists for an improved cement or concrete mix which provides an adequate plastic period, while at the same time providing an improved 1 and 28 day strength.

SUMMARY OF THE INVENTION

The present invention is directed to improved Portland cement and concrete mixes which possess adequate extended plastic period while also achieving adequate and/or improved 1 and 28 day strengths.

Basically, the invention resides in the discovery that, the addition of an alkali or alkaline earth lignosulfonate in an amount of from about 0.75 to 1.25 percent by weight lignosulfonate, sodium bicarbonate in an amount of about 1.5 and 2.5 percent by weight, and gypsum in an amount of between about 1.5 and 4.0 percent by weight to Portland cement clinker having been ground to a Blaine fineness of between about 4400 square centimeters per gram ($cm^2/g$) and up to 6000 square centimeters per gram ($cm^2/g$) provides a cement or a concrete mix, when sand and aggregate, i.e., crushed stone or gravel, are added to the cement, having a plastic period of at least about 90 minutes, a 1-day compressive strength of at least 5000 pounds per square inch (psi) and a 28 day strength of at least 6000 psi. The term gypsum is intended to include all forms of calcium sulfate, including Plaster of Paris, and anhydrite. Although the invention is intended not to be limited thereto, a preferred cement mix comprises in percents by weight, 1.0% calcium lignosulfonate, 2.0% sodium bicarbonate, 4.0% Plaster of Paris, and Portland cement clinker ground to between 4400 and 6000 $cm^2/g$. The cement mix is superior to the prior art cement mixes in that it achieves both an adequate plastic period and improved 1-day strength.

For the purpose of this application, the term "plastic period" is that period beginning with the mixing of the cement, water, additives and sand and/or aggregates, such as crushed rock or gravel, until the cement or concrete mix shows its first resistance to penetration, as measured in accordance with ASTM Test C 403. Thus, an "adequate plastic period" would be a period of time sufficient to mix and place and/or shape the concrete or cement mixture before it would begin to set, such as is known in the art. Normally, an hour would be sufficient time to mix, place, and shape concrete, but the present invention achieves adequate 1 and 28 day strengths while having a plastic period of at least about 90 minutes.

Also, for the purpose of this application, the term adequate 1-day and 28 day strengths are intended to mean at least 5000 pounds per square inch (psi) and 6000 psi, respectively, for a concrete mix comprising a Type I or Type III Portland cement having a Blaine fineness of between 4000 $cm^2/gm$ and 6000 $cm^2/gm$.

In this way, the set cement or concrete will have sufficient 1-day strength to be used or to be subject to further treatment. Thus in producing concrete products such as masonry units, panels and precast structural members, the concrete will have a long enough plastic period to allow for the embedding of reinforcing members and to be shaped or cast, as well as a sufficient compressive strength the day after casting to facilitate removal from the molds or forms without breakage. In this way, the molding equipment need not be tied up because of excessively long set and cure periods, and adequate 1-day strengths can be achieved without using steam curing, which is a costly process involving extensive equipment such as boilers, steam distribution systems, curing kilns, etc.

It therefore is an object of this invention to provide improved cement and/or concrete mix as having adequate plastic periods and improved 1-day strengths. It is a further object of this invention to provide an improved combination of Portland cement, gypsum, alkali or alkaline earth lignosulfonate and alkali bicarbonate which provides a plastic period in excess of 90 minutes and 1 and 28 day strengths in excess of 5000 psi and 6000 psi, respectively.

These and other objects and advantages of the invention will become apparent on consideration of the description and discussion which follow.

DETAILED DESCRIPTION OF THE INVENTION

The present invention achieves its unexpected results, i.e., the combination of an adequate plastic period and adequate and/or improved 1-day and 28 day compressive strengths, by the combination of certain amounts of certain ingredients which comprise the Portland cement mixes of the invention.

Broadly, the Portland cement mix includes the combination of Portland cement clinker which has been ground to a specific surface area of between 4400 $cm^2/g$ and up to 6000 $cm^2/g$, alkali or alkaline earth lignosulfonate in an amount of between about 0.75 and 1.25 percent by weight, sodium bicarbonate in an amount of between 1.5 and 2.5 percent by weight, and gypsum in an amount of 1.5 and 4.0 percent by weight. The lignosulfonate and the bicarbonate are present in a ratio of about 1 to 2, i.e., about twice as much sodium bicarbonate is added as compared to the amount of alkali or alkaline earth lignosulfonate.

Sand or sand crushed stone and/or gravel are added along with enough water to effect setting of the mix to form mortar and concrete products. The precise sand, crushed stone, gravel or other aggregate or concrete additives, which are added and/or employed will vary in their nature and quantity, that depend on the desired end use of the concrete product, and all conventional mixtures can be utilized in practicing this invention. When the porosity of the cement or concrete product is less than 5% by volume voids, 1 and 28 day strengths of at least about 5000 psi and 6000 psi, respectively, will be achieved.

The Portland cement clinker employed is any of the known and commercially available types (and reference is made to ASTM specification C 150). Types I and III cement will be preferred. The cement will be basically free of calcium sulfate, which is a normal interground addition. As compared to normal additions, the gypsum added in the present invention is in certain controlled amounts, i.e., between about 1.5 and 4.0 percent by weight, and employed in combination with sodium carbonate and an alkali or alkaline earth lignosulfonate.

The cement clinker is ground in a conventional grinding process, such as for example in a rotary ball mill, to a Blaine fineness of between about 4400 $cm^2/g$ and 6000 $cm^2/g$, as measured in accordance with ASTM C 204. Conventional grinding aids may be employed to ease the grinding process, such as, e.g., MTDA, which is a product sold by W. R. Grace, or the like.

The gypsum, which can be any of the conventional varieties of calcium sulfate ($CaSO_4$), may be added during or after the grinding process. It has been discovered that the invention performs most favorably when Plaster of Paris ($CaSO_4 \cdot \frac{1}{2}H_2O$) is used and so, when the gypsum (usually $CaSO_4 \cdot 2H_2O$) is added during the grinding step, the heat of grinding will dehydrate the gypsum to plaster.

The amount of gypsum employed will be between about 1.5 and 4.0 percent by weight. The precise amount will vary depending upon the type of cement and its fineness. Thus, generally, the finer the cement, i.e., higher Blaine fineness, the greater the amount of gypsum employed, e.g., more toward 4.0 percent than 1.5 percent. This is because the finer cements are naturally faster setting. Further, a Type I cement will require less gypsum than a Type III cement. Still further, for high alkali cements, the amount of gypsum employed will be higher as compared to low alkali cements.

The alkali or alkaline earth lignosulfonate and sodium bicarbonate normally will be added to the Portland cement clinker after it is ground. The alkali or alkaline earth lignosulfonate employed may be, e.g., sodium, potassium, ammonium, calcium or magnesium lignosulfonate, although calcium lignosulfonate is the preferred lignosulfonate, such as for example REAX-LP which is a calcium lignosulfonate sold by West Virginia Pulp and Paper Company.

The sodium bicarbonate will preferably be added at or near the point where the cement mix is to be used to form the cement and concrete products. The sodium bicarbonate ($Na_2HCO_3$) has a tendency to convert to sodium carbonate ($Na_2CO_3$), which is not nearly as effective as the bicarbonate in the combination of the invention. So either some precaution, such as sealed bags or the like, should be taken, or the addition should be delayed as long as possible.

To give those skilled in the art a better understanding of the invention, a The examples are offered merely by way of illustration, and it is not intended that they be taken as limiting its scope.

In the examples, the Portland cement clinker first was ground to the Blaine fineness being tested. Next, the appropriate amounts of gypsum or plaster, alkali or alkaline earth lignosulfonate, and sodium bicarbonate were added to the ground Portland cement clinker. The mortars were made by mixing 7 sacks of Martinsburg Type I or Type III cement per cubic yard with Whitemarsh concrete sand, having a fineness modulus of 2.3 and being present in a cement to sand ratio to 1 : 1.5 by weight, and enough water so that the water to cement ratio was about 1 : 3 by weight. In the tests involving concrete, the same amounts and ratios were used as for the mortar, except that 8 sacks of cement per cubic yard and gravel having an average size of 0.75 inch (in accordance with ACI 211.1) were used. The compressive strengths of the resulting mortar products were measured on 2-inch cubes in accordance with ASTM Specification C 109, and the concrete products were measured on 4-inch diameter by 8-inch cylinders in accordance with ASTM Specification C 39. The value "28-day strength" was not measured until Run No. P, and the value "% voids" was not measured for the mortars, i.e., runs A through O.

The data clearly indicates that when the precise amounts of lignosulfonate, bicarbonate and gypsum are used, the result is a cement mix, including concrete mixes which incorporate the cement mixes, having an adequate plastic period and improved 1-and-28-day compressive strengths. Conversely, when the amounts are within the broad ranges set forth herein and when the porosity of the finished cement product, particularly the concrete products, is less than about 5% by volume voids, the mix will have an adequate plastic period and improved 1 and 28 day compressive strengths.

Run No. U did not have a measurable one-day strength because its plastic period was greater than 1 day, i.e., over 24 hours, but its plastic period was greater than 90 minutes and it did have an improved 28 day strength.

TABLE I

| Run No. | Calcium Lignosulfonate (% by wt.) | Sodium Bicarbonate (% by wt.) | Gypsum (% by wt.) | Blaine Fineness (cm/g) | Voids (% by vol.) | Plastic Period (Min.) | Compressive One day (PSI) | Strengths 28 days (PSI) |
|---|---|---|---|---|---|---|---|---|
| A* | 1.00 | 1.0 | 0.0 | 5670 | — | 16 | 3345 | — |
| B* | 1.00 | 1.0 | 1.0 | 5670 | — | 60 | 2440 | — |
| C* | 1.00 | 1.0 | 2.0 | 5670 | — | 60 | 2175 | — |
| D* | 1.00 | 1.5 | 0.0 | 5670 | — | 20 | 6050 | — |
| E* | 1.00 | 1.5 | 1.0 | 5670 | — | 90 | 3820 | — |
| F* | 1.00 | 1.0 | 0.0 | 5510 | — | 14 | 4090 | — |
| G* | 1.00 | 1.0 | 1.0 | 5510 | — | 24 | 2570 | — |
| H* | 1.00 | 1.0 | 2.0 | 5510 | — | 74 | 2375 | — |
| I* | 1.00 | 1.5 | 0.0 | 5510 | — | 15 | D | — |
| J* | 1.00 | 1.5 | 1.0 | 5510 | — | 120 | 4110 | — |
| K* | 1.00 | 1.5 | 2.0 | 5510 | — | 150 | D | — |
| L* | 0.75 | 1.5 | 1.0 | 5670 | — | 90 | 3950 | — |
| M* | 0.75 | 1.5 | 1.0 | 5510 | — | 120 | 3675 | — |
| N* | 0.75 | 2.0 | 1.0 | 5510 | — | 12 | 6700 | — |
| O* | 0.75 | 2.0 | 2.0 | 5510 | — | 98 | 3815 | — |
| P** | 1.00 | 2.0 | 2.0 | 5510 | 4.6 | 140 | 5055 | 6840 |
| Q** | 1.00 | 2.0 | 2.0 | 5510 | 1.5 | 188 | 5770 | 7145 |
| R** | 1.00 | 2.0 | 4.0*** | 5510 | 0.0 | 280 | 6710 | 7925 |
| S** | 1.25 | 2.0 | 4.7*** | 5700 | 7.3 | 285 | 3450 | 5040 |
| T** | 1.00 | 2.0 | 6.7*** | 5700 | 10.4 | 75 | 4235 | 5290 |
| U**** | 1.00 | 2.0 | 3.0*** | 4210 | 0.4 | 24 hrs.+ | 0 | 7805 |
| V**** | 1.00 | 2.0 | 3.0*** | 5530 | 2.1 | 150 | 5300 | 7140 |
| W**** | 1.25 | 2.5 | 2.0*** | 5530 | 2.0 | 300+ | 5400 | 6680 |
| X** | 1.00 | 2.0 | 3.0*** | 5510 | 0.7 | 124 | 6030 | 8105 |
| Y** | 0.75 | 2.0 | 2.0 | 6430 | 2.3 | 30 | 5460 | 7115 |

TABLE I-continued

| No. | Calcium Ligno-sulfonate (% by wt.) | Sodium Bicarbonate (% by wt.) | Gypsum (% by wt.) | Blaine Fineness (cm/g) | Voids (% by vol.) | Plastic Period (Min.) | Compressive One day (PSI) | Strengths 28 days (PSI) |
|---|---|---|---|---|---|---|---|---|
| * | 1.00 | 2.0 | 1.5 | 6430 | 2.0 | 60 | 5850 | 6790 |

⁺Mortar made from Type III cement.
*Concrete made from Type III cement.
**Plaster of Paris (Ca SO₄ . 1/2 H₂O).
****Concrete made from Type I cement.
D — Discarded due to error before cubes could be made up for testing.

TABLE II

| Run No. | Calcium Ligno-sulfonate (% by wt.) | Sodium Bicarbonate (% by wt.) | Gypsum (% by wt.) | Blaine Fineness (cm²/g) | Voids (% by vol.) | Plastic Period (Min.) | Compressive One Day (PSI) | Strengths 28 Days (PSI) |
|---|---|---|---|---|---|---|---|---|
| AA** | 1.00 | 2.0 | 2.0*** | 5510 | 0.0 | 60 | 5475 | 7945 |
| BB** | 1.25 | 2.0 | 3.0*** | 5510 | 0.0 | 220 | 6660 | 7760 |
| CC** | 2.00 | 2.0 | 2.0*** | 5510 | 1.5 | 24 hrs.+ | 0 | 7205 |
| DD** | 1.00 | 2.0 | 3.0*** | 5510 | 0.0 | 80 | 6540 | 8715 |
| EE**** | 0.75 | 2.0 | 3.0*** | 4210 | 1.2 | 180+ | 4690 | 7535 |
| FF**** | 0.75 | 1.5 | 2.0*** | 4450 | 3.0 | 156 | 5225 | 6695 |
| GG**** | 1.00 | 2.0 | 2.0*** | 4450 | 3.2 | 86 | 5050 | 6735 |
| HH** | 1.00 | 2.0 | 3.0*** | 5790 | 2.4 | 430 | 5030 | 6930 |
| II**** | 1.25 | 2.0 | 3.0*** | 5790 | 1.6 | 105 | 7215 | 8940 |
| JJ** | 1.00 | 2.0 | 2.0 | 5510 | 4.0 | 100 | 5530 | 7285 |
| KK** | 1.25 | 2.5 | 2.0 | 5510 | 0.7 | 100 | 5960 | 8045 |
| LL** | 1.25 | 2.5 | 2.0 | 5510 | 0.3 | 168 | 5810 | 7440 |
| MM** | 1.00 | 2.0 | 3.0*** | 5510 | 0.9 | 136 | 5745 | 7380 |
| NN** | 1.25 | 2.0 | 3.0*** | 5670 | 0.7 | 167 | 5395 | 7475 |
| OO** | 1.25 | 2.0 | 3.0*** | 5670 | 0.5 | 425 | 6480 | 8640 |
| PP** | 1.25 | 2.0 | 3.0*** | 5670 | 1.0 | 290 | 6205 | 7940 |
| QQ** | 1.25 | 2.0 | 3.0*** | 5670 | 0.8 | 90 | 6560 | 8750 |
| RR** | 1.25 | 2.0 | 3.0*** | 5670 | 0.7 | 120 | 6210 | 8145 |
| SS** | 1.25 | 2.0 | 3.0*** | 5670 | 2.2 | 120 | 6380 | 8695 |
| TT***** | 1.0 | 2.0 | 1.5*** | 5500 | 2.7 | 120 | 6205 | 8180 |
| UU***** | 1.0 | 2.0 | 2.0*** | 5500 | 3.6 | 300+ | 5120 | 8230 |

**Concrete made from Type III cement.
***Plaster of Paris (Ca SO₄ . H₂O).
****Concrete made from Type I cement.
*****Concrete made from WESTVACO Low SO₃ Type III cement.

Therefore, although it has an inordinate plastic period, it was not operative, and further, it would have had an adequate 1-day strength if the amount of Plaster of Paris had been reduced to 2% by weight or the fineness has been increased over 4400 cm²/g.

Still further, although in most of the successful runs the ratio of bicarbonate to lignosulfonate was two to one, in several runs, e.g., runs No. II and NN-SS, a higher amount of lignosulfonate was used because of the relatively high fineness of the cement, i.e., close to 6000 cm²/g, such that the true ratio was less than 2 to 1. But, the ratio was considered to be close enough so as to be considered about 2 to 1. Therefore for the purposes of this application, the ratio of lignosulfonate to bicarbonate of about 1 to 2 is intended to include slight variations in the ratio which are otherwise in accordance with the teachings of this invention.

Thus, the Portland cement mixes in accordance with the teachings of the invention, when mixed with sufficient water to effect hydration and ultimately setting thereof, have a plastic period, as defined, supra, of at least about 90 minutes, and further have, when the cement or concrete product has a porosity of less than about 5% by volume voids, as measured in accordance with ASTM C 138, compressive strengths at one and twenty-eight days of at least about 5000 and 6000 psi, respectively. This provides a cement or concrete mix having a sufficient plastic period to allow for working and placing the mix, as well as a sufficient 1-day strength, without using external curing aids or processes, such as steam curing, to allow the products to be moved or otherwise processed.

While the invention has been described with reference to certain preferred embodiments thereof, those skilled in the art will appreciate that various changes and modifications and substitutions can be made without departing from the spirit of the invention. It is intended, therefore, that the invention will be limited only by the scope of the claims which follow.

I claim:

1. A high strength Portland cement mix comprising Portland cement clinker which has been ground to a specific surface area of between about 4400 cm²/g and 6000 cm²/g, alkali or alkaline earth lignosulfonate in an amount of between about 0.75 and 1.25 percent by weight, sodium bicarbonate in the amount of between about 1.5 and 2.5 percent by weight, and gypsum in an amount of between about 1.5 and 4.0 percent by weight, wherein said lignosulfonate and said bicarbonate are present in a ratio of about one to two and wherein a cement product formed from the cement mix will have a porosity of less than about 5% by volume voids, an adequate plastic period of in excess of 90 minutes, and an adequate 1-day strength of in excess of 5000 pounds per square inch.

2. A Portland cement mix according to claim 1 wherein said lignosulfonate comprises calcium lignosulfonate.

3. A Portland Cement mix according to claim 1 wherein said gypsum is Plaster of Paris.

4. A Portland cement mix according to claim 1 wherein said lignosulfonate comprises calcium lignosulfonate and is in an amount of 1.0 percent by weight, said sodium bicarbonate is in an amount of 2.0 percent by weight, and said gypsum is Plaster of Paris and is in an amount of 4.0 percent by weight.

5. A cement mix according to claim 1 further including enough water to effect hydration thereof.

6. A high strength concrete mix comprising a Portland cement clinker which has been ground to a specific surface area of between about 4400 cm$^2$/g, and 6000 cm$^2$/g, alkali or alkaline earth lignosulfonate in an amount of between about 0.75 and 1.25 percent by weight, sodium bicarbonate in an amount of between about 1.5 and 2.5 percent, and gypsum in an amount of between about 1.5 and 4.0 percent by weight, in admixture with sand and crushed stone or gravel, wherein said lignosulfonate and said bicarbonate are present in a ratio of about one to two and wherein a concrete product formed from the concrete mix has a porosity of less than about 5% by volume voids, an adequate plastic period of in excess of 90 minutes and an adequate 1-day strength of in excess of 5000 pounds per square inch.

7. A concrete mixture according to claim 6 wherein said ground Portland cement clinker is present in an amount of between about 5 and 8 sacks per cubic yard.

8. A concrete mix according to claim 6 wherein said Portland cement clinker is present in an amount of about 8 sacks per cubic yard.

9. A concrete mix according to claim 6 wherein said lignosulfonate comprises calcium lignosulfonate.

10. A concrete mix according to claim 6 wherein said gypsum is Plaster of Paris.

11. A concrete mix according to claim 6 wherein said lignosulfonate comprises calcium lignosulfonate and is in an amount of 1.0 percent by weight, said sodium bicarbonate is present in an amount of 2.0 percent by weight, and said gypsum is Plaster of Paris and is in an amount of 4.0 percent by weight.

12. A concrete mix according to claim 6 wherein cement and sand are present in a ratio of about 1 to 1½.

13. A concrete mix according to claim 6 further including enough water to effect hydration thereof.

14. A concrete mix according to claim 13 wherein said water and said cement are present in a ratio of about 1 to 3.

* * * * *

UNITED STATES PATENT AND TRADEMARK OFFICE
CERTIFICATE OF CORRECTION

PATENT NO. : 4,019,918
DATED : 26 April 1977
INVENTOR(S) : Milton Herman Wills, Jr.

It is certified that error appears in the above-identified patent and that said Letters Patent are hereby corrected as shown below:

In Column 2, line 8, after "that", the following was omitted:
--congeal the paste. The flash set which does result is not acceptable to produce--

In Column 4, line 32, after "of", the following was omitted:
--between about--

In Column 4, line 42, "that" should be -- and --

In Column 5, line 40, after "a", the following was omitted:
--number of examples were run, and the results are set forth in TABLES I & II. --

Signed and Sealed this fifth Day of July 1977

[SEAL]

Attest:

RUTH C. MASON
Attesting Officer

C. MARSHALL DANN
Commissioner of Patents and Trademarks